US012803422B2

(12) United States Patent
Dent et al.

(10) Patent No.: US 12,803,422 B2
(45) **Date of Patent: *Nov. 17, 2026**

(54) SYSTEM FOR PREVENTING TRANSFORMER SATURATION

(71) Applicants: Orris Dent, Kingston, WA (US); Gregory Wiegand, Poulsbo, WA (US)

(72) Inventors: Orris Dent, Kingston, WA (US); Gregory Wiegand, Poulsbo, WA (US)

( * ) Notice: Subject to any disclaimer, the term of this patent is extended or adjusted under 35 U.S.C. 154(b) by 172 days.

This patent is subject to a terminal disclaimer.

(21) Appl. No.: 18/787,994

(22) Filed: Jul. 29, 2024

(65) Prior Publication Data

US 2024/0388197 A1 Nov. 21, 2024

Related U.S. Application Data

(60) Division of application No. 18/239,536, filed on Aug. 29, 2023, now Pat. No. 12,051,968, which is a continuation of application No. 18/164,541, filed on Feb. 3, 2023, now Pat. No. 11,824,439, which is a division of application No. 17/101,990, filed on Nov. 23, 2020, now Pat. No. 11,601,041, which is a continuation-in-part of application No. 15/859,656, filed on Dec. 31, 2017, now Pat. No. 10,848,086.

(60) Provisional application No. 62/441,329, filed on Dec. 31, 2016.

(51) Int. Cl.

| | |
|---|---|
| ***H02M 1/40*** | (2007.01) |
| ***H01F 27/34*** | (2006.01) |
| ***H02M 3/335*** | (2006.01) |

(52) U.S. Cl.
CPC .............. *H02M 1/40* (2013.01); *H01F 27/34* (2013.01); *H02M 3/33546* (2013.01)

(58) Field of Classification Search
CPC .......... H01F 27/34; H01F 27/42; H02M 1/40; H02M 3/33546; H02M 3/33553
USPC ........................................................... 361/38
See application file for complete search history.

(56) References Cited

U.S. PATENT DOCUMENTS

| | | | | |
|---|---|---|---|---|
| 5,994,880 | A * | 11/1999 | Dropps | H02J 7/345 320/140 |
| 2006/0261889 | A1* | 11/2006 | Giovannotto | H03F 3/181 330/6 |
| 2010/0007352 | A1* | 1/2010 | Xie | G01R 31/086 324/501 |

FOREIGN PATENT DOCUMENTS

| | | | |
|---|---|---|---|
| CN | 102468653 | A * | 5/2012 |
| JP | 2004064947 | A * | 2/2004 |

OTHER PUBLICATIONS

Machine translation of Takamatsu et al. Japanese Patent Document JP 2004-64947 A Feb. 2004 (Year: 2004).*

(Continued)

*Primary Examiner* — Kevin J Comber
(74) *Attorney, Agent, or Firm* — Patrick M Dwyer

(57) ABSTRACT

A method for preventing magnetic flux saturation comprising a magnetic flux sensor transmitting magnetic flux density values, the method comprising the steps of: a microprocessor continuously receiving the transmitted magnetic flux density values; the microprocessor comparing in real time during each driving voltage half-cycle each transmitted magnetic flux density value with a selectable and programmatically stored maximum flux density value, and the microprocessor triggering a reduction of the driving voltage to a voltage value greater than zero for the remainder of the half-cycle when the selectable maximum flux density value is reached in the half cycle.

6 Claims, 14 Drawing Sheets

(56) References Cited

OTHER PUBLICATIONS

Machine translation of Meng et al. Chinese Patent Document CN 102468653 A May 2012 (Year: 2012).*

* cited by examiner

SYSTEM FOR PREVENTING TRANSFORMER SATURATION

CROSS REFERENCE TO RELATED APPLICATIONS

This application is a Division of U.S. patent application Ser. No. 18/239,536 filed Aug. 29, 2023, which is a Continuation of U.S. patent application Ser. No. 18/164,541 filed Feb. 3, 2023, which is a Division of U.S. patent application Ser. No. 17/101,990 filed Nov. 23, 2020 now issued Mar. 7, 2023 as U.S. Pat. No. 11,601,041, which is a Continuation-in-Part of U.S. patent application Ser. No. 15/859,656 filed Dec. 31, 2017 now issued Nov. 24, 2020 as U.S. Pat. No. 10,848,086, which claimed priority to U.S. Provisional Patent application 62/441,329 filed Dec. 31, 2016, all of which are hereby incorporated by this reference as if fully set forth herein.

TECHNICAL FIELD

This disclosure relates to controlling magnetic flux density in a volume by modulation of the electromotive force affecting that volume proportionate to the measured magnetic flux density within the volume; more particularly it relates to transformer core saturation and methods of limiting or preventing such saturation; more particularly, it relates to feedback systems employing direct magnetic flux sensors.

BACKGROUND

AC line voltage regulators maintain a constant output voltage (within limits) while the line voltage input to them changes. One popular class of electronic voltage regulators utilize a series injection transformer, the secondary of which is connected in series between the input voltage terminal and the output voltage terminal, and the primary of which is connected to a switch mode power supply (SMPS) that can supply a modulated in-phase or counter-phase voltage derived from the input voltage terminal. A control system monitors the input and output voltages and commands the SMPS depth of modulation and phase so that the transformer secondary voltage boosts or bucks the input voltage in order to maintain a constant output voltage.

At full boost and at full buck, the primary of the series injection transformer is essentially driven directly from the input terminal voltage and this, the maximum possible high line voltage, becomes a critical factor in the design specification for the series injection transformer.

Economics and efficiency both dictate that the transformer be as small, light, and quiet as possible, leading conventionally to the use of a transformer with a toroidal wound steel core rather than with a core made of stacked steel laminations. This is because, magnetically speaking, a toroidal core appears to be largely magnetizable steel in series with a very small non-magnetizable air gap, while the stacked core has a significantly smaller ratio of steel to air gap. This allows a toroidal transformer to be smaller and more efficient than a stacked-core transformer for the same power rating. However, the reduction in the ratio of air to steel leads to more abrupt saturation of the core.

The most desirable transformer steel alloys are able to be magnetized to a high maximum flux density, meaning that a transformer core with these alloys can be smaller than one made of a low maximum flux density steel to reach the same total flux. Also high flux density steels typically require less energy to be magnetized in both directions reversibly over an AC cycle, meaning that the transformer will be more efficient and run cooler than one with ‘lossy’ steel.

Such high flux density alloys do tend to saturate abruptly at their design flux limit however, and at saturation the magnetic field in the transformer core no longer increases in direct proportion to the current in the transformer primary winding. In an unloaded transformer, the primary current is referred to as the core excitation current. It is the rate of increase in the core magnetic field that limits the rate of rise of excitation current and at saturation this magnetic field rate of rise reduces to almost nothing. Thus at saturation the excitation current increases rapidly and can reach a level that is limited solely by the resistance of the primary winding.

In other words, a saturated transformer draws very high currents similar to a short circuit. In fact this rise in primary current has historically been used as a 2nd order, or indirect, indicator of core saturation, but it is difficult and/or impossible to separate this indication from load related, over-current events due to the non-linearity of transformers.

A second critical factor in the design specification for the transformer, of equal importance to the maximum excitation voltage, is the frequency of the AC line. This is because the transformer core magnetic field is driven in opposite directions for the duration of each half-cycle of the AC voltage, and theoretically the magnetic field re-centers each cycle, assuming the half-cycle time durations and voltages are equal. Smallest and most efficient transformers are designed to be driven just to the edge of saturation on each half-cycle. Thus the cores in such transformers are very nearly in saturation twice per full AC cycle. The magnetic flux peak in the core material comes just at the end of each half-cycle, when the integral of Volts×Time reaches a peak. This Volt-Second integral can be thought of as the average voltage across the transformer primary terminals over time. This Volt-Second integral is unique to each transformer design, and the transformer will saturate if this number is exceeded. The magnetic characteristics of any given transformer core are typically described graphically in the form of a B-H curve, as will be appreciated by those skilled in the art.

If power to the load on a power line remain constant, the Volt-Second integral of the AC supply should be zero over the long term. In simple terms, this means that the voltage on every positive half-cycle is exactly equal to the voltage on every negative half-cycle for long time periods, ie that the AC waveform is voltage symmetrical.

However, line loading is almost never constant and the Volt-Second integral can be perturbed for various periods of time by a multitude of causes (such as by SCR controlled loads), sometimes to the point of causing long term transformer saturation with consequent equipment overheating and outages due to circuit breakers or fuses opening, any or all of which can result in taking equipment off line. Also the pulsed currents caused by the saturation can disturb sensitive equipment that shares the same utility line by degrading the line voltage regulation.

In addition, it is not just long-term AC waveform asymmetry that is a problem; it is also a problem at shorter time scales. The Volt-Second integral begins averaging on the instant that a transformer is connected to a power source. It is believed that transformer steel has a kind of ‘flux memory’. If the transformer was disconnected at the instant when the core was near saturation in either direction, it would maintain a remnant magnetic field in that same direction. When power is re-applied, depending on the instantaneous AC polarity, the remnant field will add to or subtract from the field being induced by the applied voltage. If the fields add, the core can go into deep saturation long before the Volt-Second integral number is reached and can stay saturated for a considerable portion of a half-cycle, meanwhile drawing a very large current. This is why toroidal transformers generally require current limitation circuitry to protect equipment.

To summarize: small, light and efficient torroidal transformers have an increased tendency to saturate. Saturation is detrimental to equipment life and good supply voltage regulation. A transformer is most efficient when it is operated at high flux levels, ie just below the saturation point. Therefore there is value in a system that can reliably control a transformer to run near its peak flux rating by sensing and limiting the flux fast enough to prevent saturation.

To take action to prevent saturation, the flux state of the transformer core must be known. Various schemes for doing so have been proposed, including E-core with air gap in an external leg (Patel 1980), reduced cross-section and additional magnetic path (J. A. Ferreira 1997), integration of applied voltage by external RC network (D. Wilson 1981), measurement of magnetizing current (J. W. Kolar 2000), superimposed orthogonal flux density with external coil (S. Cuk 1982) and shared magnetic path between a main core and an auxiliary core, where magnetic flux density through the main core changes properties of the shared magnetic path, modifying, for example, the inductance seen from the auxiliary core winding (G. Ortiz et al, undated Swiss Power Institute paper).

It is known that core flux state can be estimated by applying a known algorithm to the measured excitation voltage over time to calculate flux state from the model inside the algorithm. However, algorithmic means are only good if the model is detailed, precise and accurate, and such means require a rather long history of the conditions in which the transformer is operated before the algorithm becomes reliable. In other words, the algorithm is nearly useless when the transformer is first switched on. Crafting a good model is also a difficult task, a task that must be repeated for every different transformer to which the model is to be applied.

Alternatively a means to directly or indirectly measure the flux density of the core magnetic field can be applied.

Direct measurement of the flux state of the transformer core has recently been done either with Hall-effect devices inserted into apertures in the core, or by measuring the permeability of a portion of the core. Indirect measurement of the flux state of the transformer core can be done using a secondary core structure and then inferring the flux level from the scaled permeability.

Hall-effect devices have a relatively small signal to noise ratio, a limited temperature range, and a tendency to drift. Permeability measuring circuits and secondary core structure can be complicated, slow to respond relative to the flux change in the main core and often require individual calibration because of difficulty in precisely repeating the mechanical placement of the sensing element.

Additionally, transformer core flux naturally alternates (swings) from positive to negative following the AC voltage input, and if the volt-second integral of the drive voltage is not balanced (from a DC, or half-cycle, perspective), the core can exhibit a DC offset (meaning there is higher peak flux density in one half cycle than during the other). This DC offset can exist for long periods of time (increasing the core losses) without it actually saturating the transformer.

Since half-cycle saturation can occur in very small orders of time, ie near instantaneous, what is needed is a means both to directly and programmatically (automatically) detect and correct (limit) magnetic flux densities and DC offset irregularities in equally small orders of time commensurate with the dynamics of such saturation.

DISCLOSURE

A relatively recent technological innovation, the Giant Magneto-Resistive (GMR) (also sometimes referred to as 'magneto-resistant') sensor is applied in a surprising and novel way to yield direct, 1st order, near instantaneous, programmatic measurement and limitation of the core flux and or DC offset irregularities.

The GMR is small enough to be easily positioned within the transformer core material; for example within in a small bore hole drilled into the core, and this bore causes only minimal disruption to the flux path. GMRs are small, robust, fast, heat tolerant and have a relatively large signal to noise ratio for the range of fluxes being measured. GMRs are available in a bridge topology, so the drift over a large temperature range is not a great problem. Alternative magneto-resistive technologies may also be employed, such as Tunnel Magneto-Resistive (TMR) or other magnetic tunnel junction based sensors including giant magnetoresistance (GMR), colossal magnetoresistance (CMR), and extraordinary magnetoresistance (EMR). These sensors are employed as otherwise disclosed herein for GMR.

The disclosed system limits the magnetic flux density in a transformer core below a level at which the core is in saturation by modulation of the magneto-motive force produced by the transformer primary winding, the modulation being controlled by direct, real-time (near instantaneous) and continuous measurement of the flux density within the core. 'Direct measurement' as used in this disclosure means measurement from within the core by a sensor placed within the core.

The disclosed system uses a GMR to directly sense flux density and then uses the GMR output signal to input and drive various firmware computations which in turn modify the voltage at the primary just before saturation occurs. Any line transients resulting from these half-cycle modulations are desirably removed or otherwise conditioned in ways that will be known to those skilled in the art.

Using the sensor output as a threshold measurement for limiting excitation voltage as herein disclosed is only one possible use of the disclosed sensor. In an alternative or possibly parallel implementation of the sensor, the sensor output is integrated over time to compute the equivalent of a 'flux-second' value. This facilitates optimal control of the magnetic flux by continually computing in real time the effect on the magnetic core flux of the volt-seconds applied to the control winding. These computations are then used to programmatically and automatically regulate control winding voltage and thus keep the flux constantly centered (or very nearly so) on the B-H curve.

It will be appreciated that the flux-seconds value does not quite have a linear relationship to the volt-seconds value as applied to the drive winding. They are not generally aligned, especially with reference to the time domain. This nonlinearity with respect to time goes beyond the typical 90 degree lag in the flux density mentioned herein. Consider that a change in the DC offset of the drive voltage can take some seconds or more to manifest an effect of that offset in the core flux balance. Steerage of the core flux is rather "squishy" compared to a change of volt-seconds input on the drive winding, due at least in part to variable latencies, which in turn depend on properties of the core materials.

Thus integrating volt-seconds is not the same as, or a substitute for, a direct first order measurement of flux-seconds.

One suitable amplifier circuit for use with bridge-configured GMR sensors is illustrated in FIG. 1. This circuit buffers the relatively high impedance GMR sensor so that it can be remotely located from the balance of the signal processing circuitry. It is desirable to separate the flux sensor itself from the balance of the signal processing circuitry in electrically noisy environments, or for isolation requirements, or in other physical circumstances, such as will occur to those skilled in the art.

FIGS. 3 & 4 show the FIG. 1 circuitry as a block labeled "Flux Sensor". At a minimum the GMR flux sensor, and advantageously the entire circuitry shown in FIG. 1, are desirably located within the lamination structure of the transformer core. This can be accomplished by drilling a small hole, advantageously perpendicular to the laminations, or otherwise by creating a void, either between or within the laminations, and large enough to accommodate the flux sensor. FIG. 7 illustrates an implementation of these circuits for a series injection topology.

A microprocessor and set of instructions for use with the GMR sensor output is also disclosed. Use of a microprocessor allows for a low-cost, low-component-count method to condition the sensor output per the requirements of the regulator pulse width modulation (PWM) of the SMPS. Particular instructions for the microprocessor will vary according to desired or required signal levels, timing requirements, power supply availability, and the like of a particular physical and electrical application, as will be appreciated by those skilled in the art. But a part of all such instruction sets for the disclosed flux sensor include the following steps and continuous real-time flux saturation monitoring, as illustrated in FIG. 8. Reading core flux levels continuously and in real time via the GMR output and then modifying the PWM (such as, but not limited to, gating it off), for flux levels above a selectable level value during a particular driving voltage half-cycle, are also part of the microprocessor instructions.

In FIG. 7 a microprocessor is advantageously employed to provide signal conditioning from the GMR flux sensor and to gate the regulator PWM as a function of continuous and real-time direct-sensed flux level or saturation from the flux sensor (thereby limiting the Volt-Second integral). The microprocessor also desirably runs, on a half-cycle by half-cycle basis, a test of the integrity of the GMR sensor circuitry and provides a hold-off delay, as further discussed herein. The hold-off delay is selectable and proportional (generally inversely), as will be appreciated by those skilled in the art, to the system frequency. Testing the GMR sensor circuitry includes the step of back-driving the sensor signal lines in various combinations to determine if one of at least three sensor failure conditions exists: (1) the sensor leads are shorted together; (2) the sensor leads are open; or (3) the sensor leads are shorted to either power supply rail.

The Hold-Off delay may also be effected by means other than a circuit testing, such as by a programmable 1-2 millisecond delay (desirably about 10% of the length of the voltage half-cycle) on the PWM gating at the beginning of each half-cycle.

Transformer excitation polarity is an input to the microprocessor and a change to polarity triggers the sensor test period (or other programable hold-off delay) at the beginning of each half-cycle, a time period during which saturation rarely occurs. If there is a sensor fault it is indicated to the supervisor control circuitry by one or more of various means, for instance, a pair of short pulses coordinated with every drive voltage polarity change. Since a sensor fault disables normal flux level monitoring, it requires timely intervention, and may result in a predetermined modification of the SMPS PWM.

During each half-cycle flux sensor testing the PWM gating function is turned off, for example, for approximately 10% of the half-cycle duration (about 1-2 milliseconds in a 50 or 60 cycle system) after the transformer excitation voltage changes polarity. This Hold-Off interval period, during which the flux level is likely not yet affected by the reverse in primary voltage polarity, is believed to contribute to the transformer efficiently recovering from near saturation, and is desirable to prevent false triggering of saturation signals after these polarity change points. A false saturation signal at the beginning of a half-cycle would interrupt the PWM voltage for the remainder of the half-cycle, and that would not allow the transformer flux to re-center.

If the drive voltage is conceived, by way of illustration, in a near-perfect transformer to be a square wave of equal positive and negative durations and that the amplitude is microscopically less than that required to saturate the transformer, then the flux level is a triangular wave with flux peaking exactly at the moment when the drive voltage changes sign, crossing through zero at the midpoint of the half-cycle, and reaching an opposite polarity peak at the next voltage sign change.

If the drive voltage then increases just enough so that the flux level reaches saturation threshold one millisecond before the end of each half-cycle, then the microprocessor interrupts the primary voltage (gates the PWM off) and holds it off for the remainder of the half-cycle. The transformer drive decreases or even drops the voltage to zero for the remainder of the half-cycle and the transformer flux essentially freezes at the threshold level during that half-cycle. At the next drive voltage zero crossing the PWM again becomes active, and the transformer flux begins to be driven toward its opposite polarity and toward the opposite threshold. After sufficient time, in this example flux levels balance out and the flux waveform is a triangle wave with opposite peaks flattened.

Without a Hold-Off Interval (and or if there is noise in the flux sensor signal in the moment just after the drive voltage changes from positive to negative) the saturation threshold can be tripped, the PWM made zero, and the transformer drive voltage goes to zero. The transformer flux therefore stays almost exactly at the positive threshold for the time duration of the missing negative half-cycle, then resumes increasing at the moment the positive drive voltage is re-applied. In this event an almost instantaneous deep saturation occurs.

With the Hold-Off Interval however, the primary winding drive voltage always has sufficient time to force the flux below the threshold level so that the desirable PWM gating generally only occurs near the end of a half-cycle. Thus ON-time for each drive voltage half-cycle is servo-ed to balance out the flux amplitudes in the transformer and thereby to keep OFF-times to a minimum.

Controlling the transformer saturation by forcing the drive voltage to zero to prevent transformer saturation does also introduce a generally small but measurable transient into the transformer output voltage waveform at the AC zero crossing point. Also it is a reactive rather than a proactive means to handle long-term DC offset (AC asymmetry).

An addition to the microprocessor instruction set provides for the linear GMR sensor output to cause adjustment of the voltage source PWM on a half-cycle-by-half-cycle basis so that any transformer drive voltage asymmetry is cancelled without disruption. See FIGS. 3, 5 and 7. This technique actively centers the transformer flux excursions and results in reduction of transformer heating and line current pulsation. Asymmetry of the series injection transformer primary drive voltage is typically the result of differences in the resistance of individual components in the SMPS switching circuit and cumulative PWM timing errors. Asymmetry of the AC line can also be transmitted to the SMPS and affect the drive voltage.

A process that equalizes transformer flux excursions over time differentially modulates the amplitude of positive vs negative half-cycle drive voltages to the series injection transformer. This is done by multiplying the PWM for positive half-cycles with a gain variable Kpos which is different from the negative half-cycle gain variable Kneg. The ratio of these two variables (Kpos to Kneg) can be adjusted by slowly changing the ratio in one direction until, for example, the transformer begins to saturate on the positive half-cycles, then changing the ratio in the other direction until the transformer begins to saturate on negative half-cycles. The ideal setting for the ratio will then be centered between the values that caused the opposite-polarity saturations. This ratio-setting desirably runs continuously as a background real-time process or alternatively periodically as determined by power line conditions.

It is to be noted that application of the disclosed system is not limited to flux sensing, flux limiting and balancing applications for series injection transformers. All transformers and inductors behave similarly with respect to flux in their magnet core.

These methods of modulating the PWM and thereby modulating the transformer primary voltage are advantageous over earlier attempts to control transformer flux excursions by using a separate (additional) transformer winding to inject DC current. However, in the absence of PWM modulation of the transformer primary, the disclosed system can still be used to control a separate (additional) transformer winding to inject DC current, as is otherwise well known. See circuit example illustrated in FIG. 4. This is a diagram of a transformer flux centering control system that uses current feedback via an auxiliary transformer winding. This control system senses the transformer core flux levels over time and uses that information to control current in an auxiliary transformer winding in such a manner as to maintain the averaged flux level at zero. The auxiliary winding is there not to sense flux, but rather to inject DC current in order to alter the flux level of the core. This action compensates for DC offset on the AC line to the transformer.

An electrically isolated, self-powered flux sensor is also disclosed, for example, as an optically coupled flux sensor. In the case of application in higher voltage distribution and power transformers, the flux sensing circuit is altered such that it is a self-powered, and electrically isolated, flux sensing module. This module triggers an appropriate flux limiting method using some electrically isolated signaling method such as, but not limited to, fiber optics. An example is schematically illustrated in FIG. 6. It is desirably housed in an appropriate hermetically sealed container for use in oil filled transformers.

In some cases, the flux sensor output is used not only as a threshold, but also (or instead) as an input to a processor with programmed instructions to integrate this output over time. This instantaneous, continuous integration yields what may be called a flux-second value which is analogous to the commonly understood volt-second integration. Since the flux sensor signal is uni-polar, the flux-second value is coordinated with an AC voltage polarity input in order to assign the flux-second value a bi-polar value (+ or −) that is synchronized with the drive winding circuit. It will be appreciated that the AC waveform on the transformer drive winding theoretically precedes the flux density signal by 90° in cyclical terms.

Using conventional volt-second integration as a control input to the drive winding can effect a balance of the positive and negative voltage cycles, which in turn can effect a constant transformer flux balance. But by itself it does not provide any direct information about the existence or magnitude of a DC bias developing in the core. Volt-Second integration has long been used as a 2nd order approximation of the transformer flux density. Now that 1st order measurement of the flux density is achieved, it also makes sense to integrate it over time and to use that information to "steer" the flux balance and keep the transformer flux "centered" on the B-H curve (See FIG. 14).

Using a sensor-inputted and constantly processor-computed flux-second integration value as a control input to control the half cycle transformer drive winding voltage accomplishes three things:

1. sensing and measuring a changing DC offset condition in real time;
2. correcting the changing DC offset by varying the volt-seconds applied to the drive winding every half cycle; and
3. sensing and controlling DC offset enables designing a transformer which runs at higher flux levels, which in turn allows for use of a physically smaller iron core, lower core losses (for instance, iron losses), and greater dynamic range of the series injection transformer.

This disclosure generally covering flux sensor placement in a toroidal transformer core is by way of illustration and not limitation. The flux sensor system works well in any style of transformer core construction. Furthermore, any medium to high permeability magnetic material will serve, including but not limited to powdered iron cores such as may be found in motors, solenoids, inductors, transformers and the like.

A system for preventing magnetic saturation in a magnetizable material such as transformer cores, inductors and the like is disclosed. In general, a magnetic flux sensor is disposed within the magnetizable material, for example in a bore drilled or let into the material of a toroidal transformer core. The transformer or the like has applied a primary driving voltage having opposite phase half-cycles. The sensor transmits a sensor output that is continuously received into machine readable memory and used by a hardware processor such as a microprocessor that is programed to process, in accordance with a set of instructions stored in the machine readable memory, the sensor output and to also continuously compare in real time the sensor output with a stored selectable maximum flux sensor output value. This maximum flux sensor output value may be empirically determined as will be familiar to those skilled in the art, or provided by the manufacturer, or in some other way determined, now known or later developed. Responsive to the comparison of real-time sensor output value to the stored maximum value, the microprocessor either allows, during each driving voltage half-cycle, the driving voltage to continue unabated while the sensor output remains below the selectable maximum value, or triggers a gate to modify the driving voltage for the remainder of the half-cycle when the selectable maximum value is reached. This modification can be a programmatic reduction in driving voltage or change in polarity, or a complete cut-off to zero.

The disclosed system may also include an electrically isolated, self-powered flux sensor, with or without fiber optic electrically isolated signal transmission from the flux sensor to the microprocessor.

A particular feature of the disclosed system is a programable hold-off time delay having a programable duration that is programably and selectively imposed during one or more of the driving voltage half-cycles. The hold-off time delay is advantageously part of instructions for a system circuitry integrity check.

A method of preventing magnetic flux saturation in a magnetizable material is also disclosed. A magnetic flux is induced in a core by a primary driving voltage having opposite phase half-cycles and a magnetic flux sensor within the core continuously senses and transmits to a programmable microprocessor a magnetic flux density value from within the magnetizable material. The microprocessor continuously receives the transmitted magnetic flux density value and compares in real time during each driving voltage half-cycle each transmitted magnetic flux density value with a selectable and programmatically stored maximum flux density value. The microprocessor triggers a gate to modify the driving voltage for the remainder of the half-cycle when the selectable maximum flux density value is reached. This driving voltage modification may be in any of the ways discussed above, as well as in ways which will occur to persons skilled in the art and having an appreciation of the disclosed system and methods.

The disclosed method likewise desirably includes a hold-off time delay having a programmable duration that is programably and selectively imposed during one or more of the driving voltage half-cycles. The method advantageously also includes multiplying a PWM for positive half-cycles with a gain variable Kpos and for negative half-cycles with a gain variable Kneg, where Kpos and Kneg have different values.

A method of managing cumulative DC offset (with its attendant core losses) in a magnetizable material is also disclosed. Like the method disclosed above for managing and preventing core saturation, a magnetic flux is induced in a core by a primary driving voltage, and the magnetic flux sensor within the core continuously senses and transmits to a programmable hardware processor a magnetic flux density value from within the magnetizable material. In this alternate method, the hardware processor continuously receives the transmitted magnetic flux density value and integrates it over time to compute a 'flux-second' value in real time during each driving voltage half-cycle. The processor controls the half-cycle PWM programmatically to 'center' the core flux on the B-H curve, such as by employing the foregoing Kpos and Kneg values.

A system for preventing transformer saturation is also disclosed, where the system uses a GMR or the like to continuously measure and transmit a flux density value for continuous use as a microprocessor input to control a modification of transformer primary voltage (such as discussed above) when the transmitted flux density value matches a preselected flux density value approximating a transformer saturation value. The disclosed system for controlling a voltage having opposite phase half-cycles also includes a set of microprocessor stored instructions for controlling a hold-off delay having a programmable duration that is programably and selectively imposed during one or more of the voltage half-cycles.

An alternate system for managing and centering a cumulative DC offset in a magnetizable material is disclosed. The system has a primary driving voltage with opposite phase half-cycles and a magnetic flux sensor operably disposed within the magnetizable material. A hardware processor is operatively associated with a machine readable memory and a set of instructions is stored in the machine readable memory. The flux sensor has a sensor output that is continuously received into the machine readable memory, and the hardware processor is programed, in accordance with the set of instructions stored in the machine readable memory, to process the flux sensor output for each phase half-cycle to continuously compute and re-compute in real time a flux-second integral for each half-cycle.

The two half-cycle flux-second integrals are programmatically and continuously compared to each other for an instantaneous DC offset value, and the offset value drives a slow loop DC compensation circuit (of a type and configuration that will occur to those skilled in the art) to steer a PWM control to vary the primary driving voltage in such a way as to add a DC voltage to the phase half-cycle that is deficient and or to subtract a DC voltage from the phase half-cycle that is contributing to the DC offset, in effect to continuously and automatically control the DC offset of the AC primary drive voltage to effect minimal DC offset.

Optional gain variables Kpos and Kneg are advantageously stored in the machine readable memory and the slow loop DC compensation circuit steering the PWM for positive half-cycles with gain variable Kpos and for negative half-cycles with gain variable Kneg to center the DC offset for each half-cycle.

An alternate method for managing and centering a cumulative DC offset in a magnetizable material with a magnetic flux induced by a primary driving voltage having opposite phase half-cycles, and a magnetic flux sensor disposed within the magnetizable material is disclosed. The flux sensor continuously transmits to a programmable hardware processor a magnetic flux density value for each half-cycle from within the magnetizable material. The processor has access to a machine readable memory in which is stored a set of programmable instructions. A hardware processor continuously and in real time receives and stores into the machine readable memory the transmitted magnetic flux density value for each half-cycle, and the hardware processor continuously and in real time during each half-cycle computes and re-computes with each successively received magnetic flux density value a flux-second integral for each half-cycle.

The hardware processor programmatically and continuously compares each of the two half-cycle flux-second integrals to each other for an instantaneous DC offset value and using the DC offset value, drives a slow loop DC compensation circuit to steer a PWM control to vary the primary driving voltage in such a way as to add a DC voltage to the phase half-cycle that is deficient and or to subtract a DC voltage from the phase half-cycle that is contributing to the DC offset, in effect continuously and automatically centering the DC voltage.

DETAILED DESCRIPTION

Figure 1:
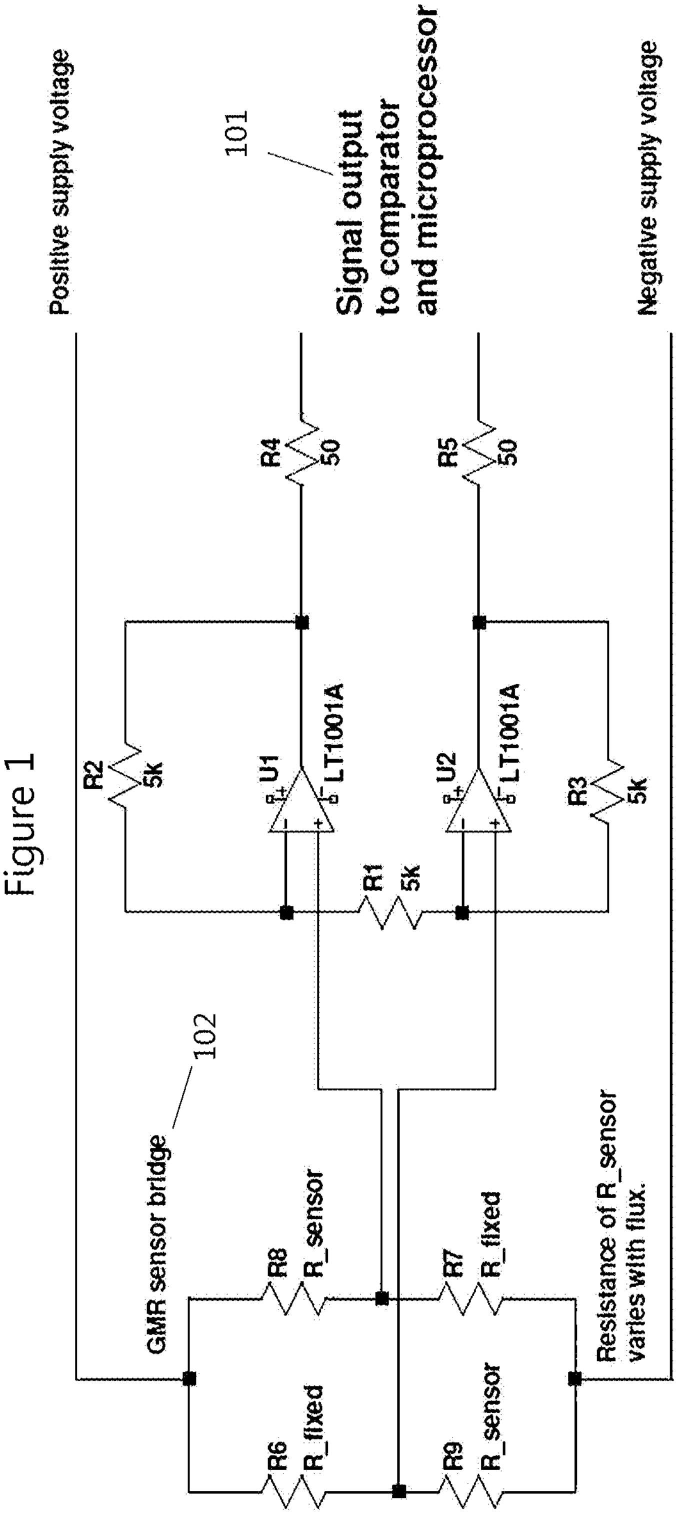
FIG. 1 is a circuit schematic of an aspect of the disclosure.

A circuit for use with bridge-configured GMR sensors is illustrated in FIG. 1. GMR sensing bridge 102 has signal output 101 to the microprocessor.

The flux sensor also enables the flux in power transformers to stay centered in the presence of any DC offset originating in the AC line. Such a circuit is further illustrated in FIGS. 3 and 5.

Figure 3:
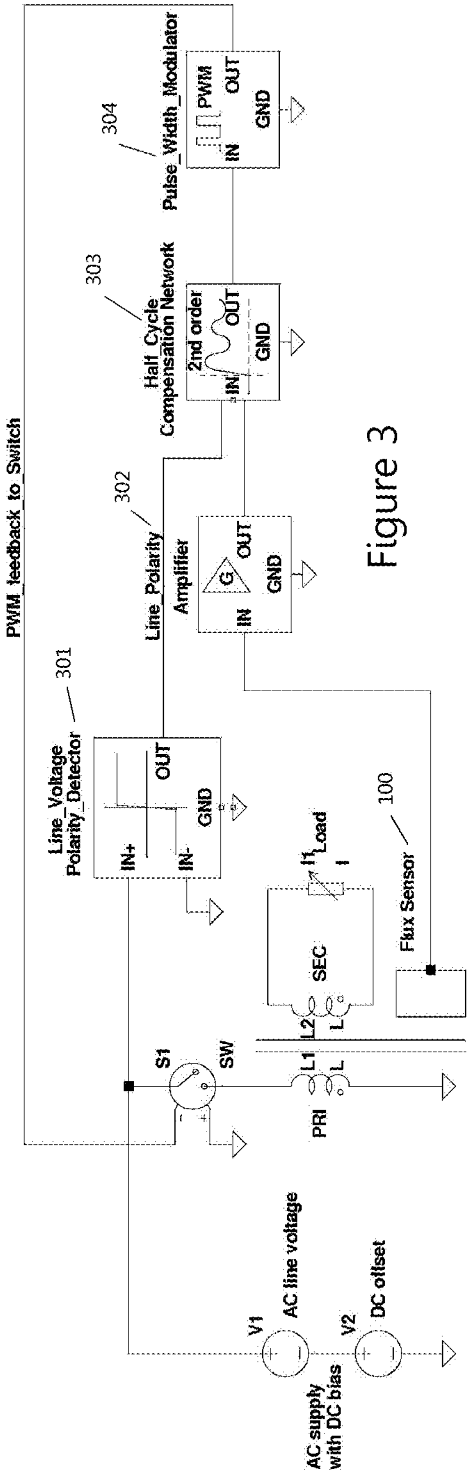
FIG. 3 is a circuit schematic of an aspect of the disclosure.

FIG. 3 is a diagram of a transformer flux centering control system that uses modulation of the AC voltage applied to the transformer primary. The Switch ON: OFF time is modulated as a function of supply line polarity and transformer flux level on a half-cycle-by-half-cycle time basis, employing conventional line voltage polarity detector 301, amplifier 302, half-cycle compensation 303, PWM 304 and novel flux sensor 100, as discussed above.

Figure 5:
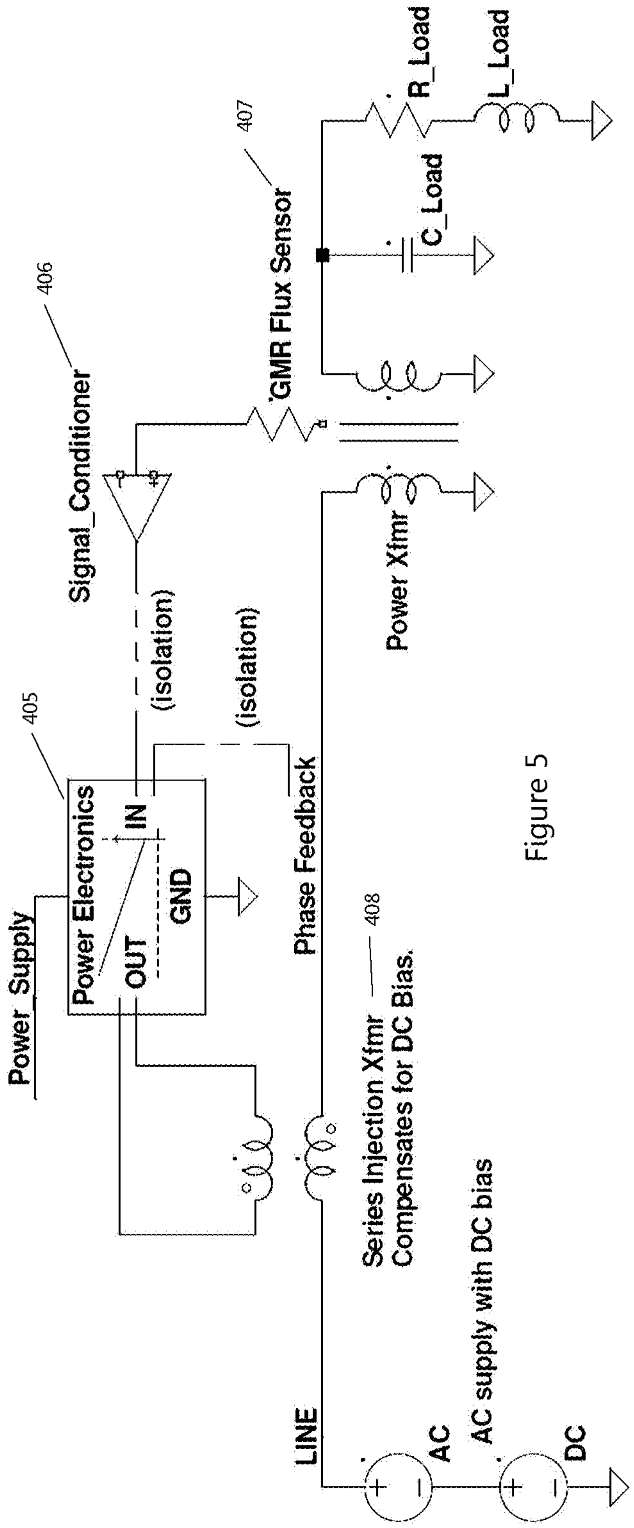
FIG. 5 is a circuit schematic of an aspect of the disclosure.

FIG. 5 provides the same function utilizing a series injection topology. The control voltage is increased or reduced each half-cycle so that the power transformer Volt-Second interval is altered so as to drive the flux excursions to a minimum, and employs conventional power electronics block 405, signal conditioner block 406, series injection transformer 408 and novel GMR flux sensor 407.

In both illustrations, these control systems sense continuously and in real-time the instantaneous transformer-core flux levels and uses that information to instantly and in real-time control the transformer primary voltage in such a manner as to maintain the averaged flux level at zero. This action compensates for DC offset on the AC line to the transformer.

In the case of a series injection voltage regulator, the voltage amplitude and polarity are varied as needed on the primary winding of a series-injection transformer to achieve the desired output voltage correction on the secondary winding. This can be accomplished by using an inverter or an AC to AC converter with an H bridge.

Figure 7:
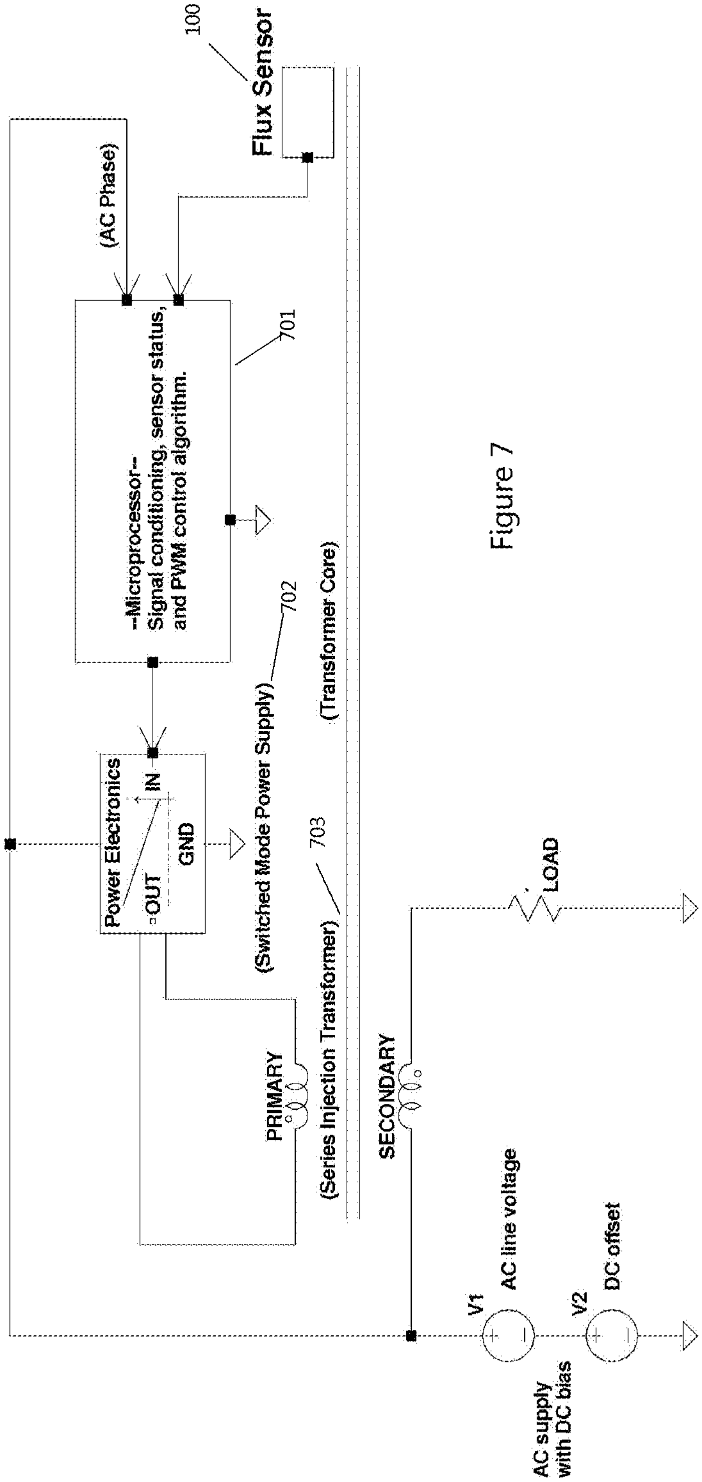
FIG. 7 is a circuit schematic of an aspect of the disclosure.

In FIG. 7 transformer saturation is prevented by modifying the voltage source driving the series injection transformer primary to either reduce the voltage or cut it off to zero (see voltage modification discussion herein) when the GMR sensor indicates a transformer flux level approaching saturation. The reduced or zero voltage is maintained until the polarity of the line voltage changes, whereupon the full drive voltage is re-enabled, advantageously at the zero crossing, and the reversed current in the transformer primary begins driving the flux away from saturation. FIG. 7 illustrates SMPS 702, microprocessor block 701, series injection transformer 703 and novel flux sensor 100.

FIG. 7 also illustrates a transformer flux centering control system that modulates the AC voltage applied to the transformer primary. This technique is also illustrated in the scope shots below.

Figure 2:
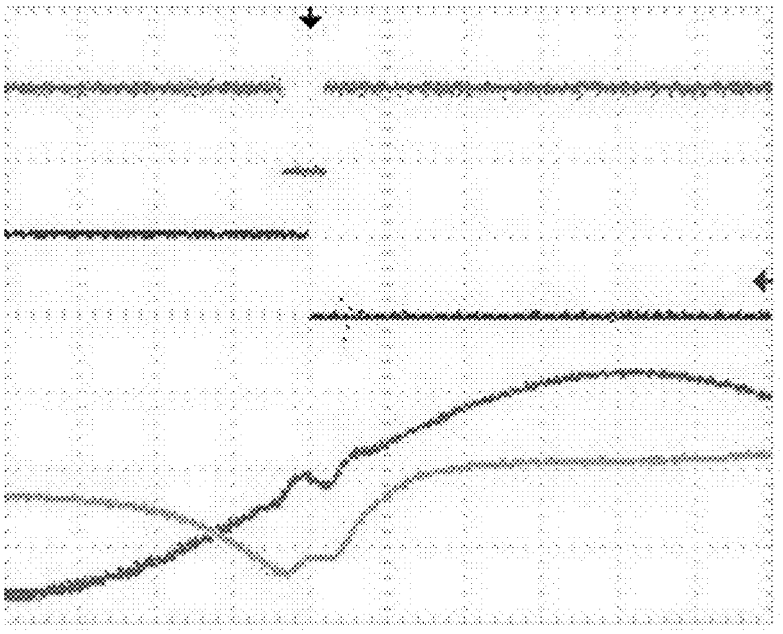
FIG. 2 is an oscilloscope screen shot of an aspect of the disclosure.

In the scope traces shown in FIG. 2, Cyan is the Sat line, Magenta is the AC polarity circuit output, Green is the AC voltage on the transformer primary and Yellow is the current on the transformer primary. This is a scope shot of a negative saturation where the cyan line goes low, which interrupts the PWM and consequently the primary winding drive voltage to the series injection transformer.

Figure 4:
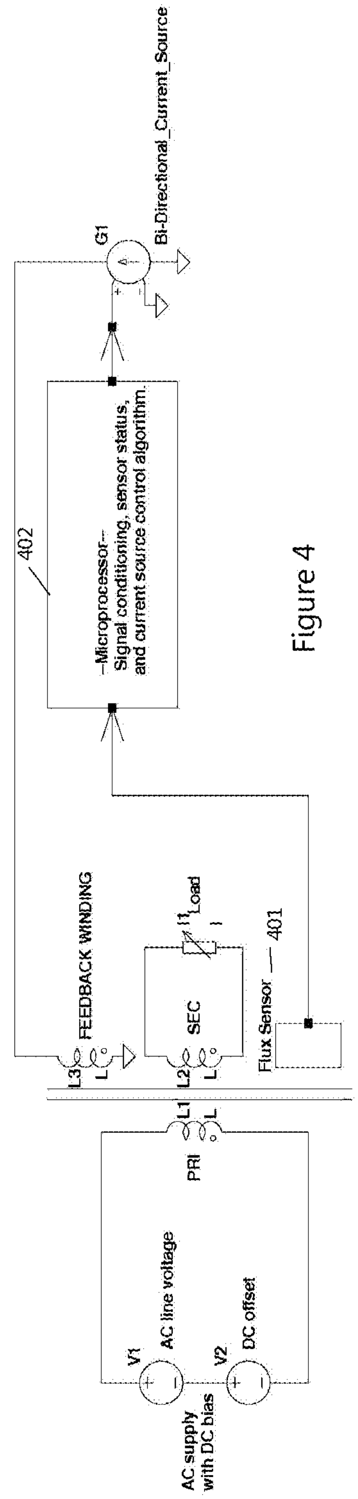
FIG. 4 is a circuit schematic of an aspect of the disclosure.

Also disclosed is a method of providing a direct, first-order flux measurement of a transformer core or other magnetic structure, in order to control an independent third winding provided to inject DC current with the proper polarity into the transformer core such that it reduces the instantaneous core flux level or, over a longer time frame, it is used to center the core flux to compensate for DC offset, as shown in FIG. 4. Novel flux sensor 401 and microprocessor block 402 are illustrated.

Figure 6:
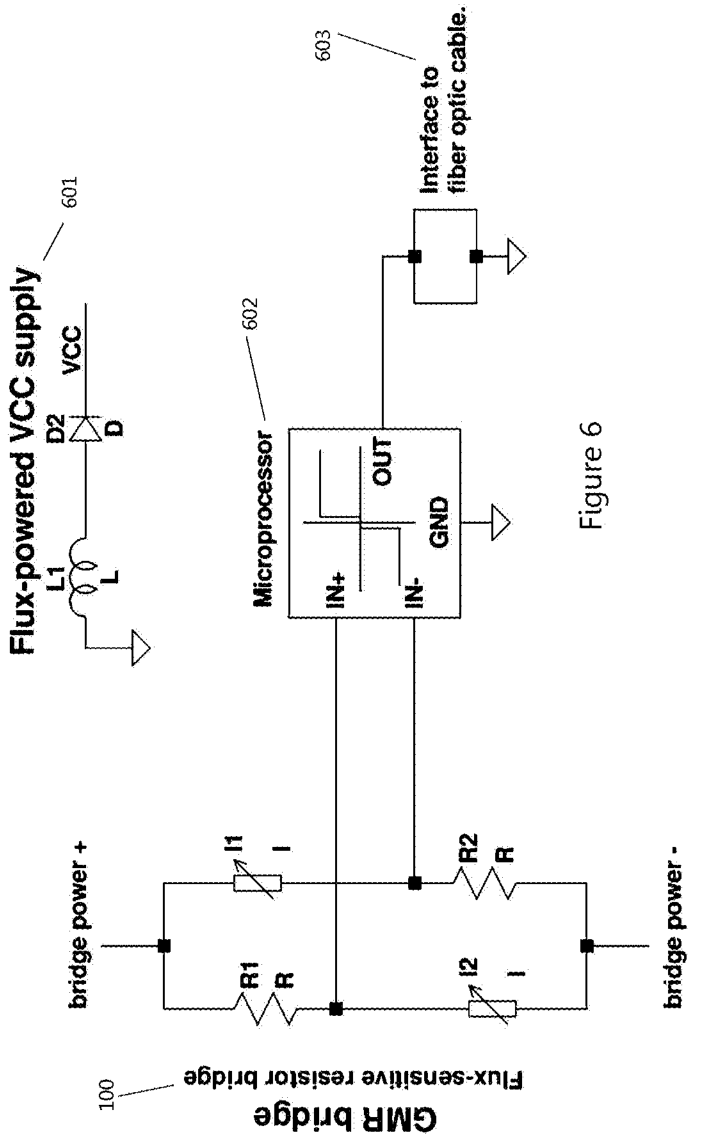
FIG. 6 is a circuit schematic of an aspect of the disclosure.

In FIG. 6 an alternate schematic of an electrically isolated, fiber optic flux sensor is shown with flux-powered VCC 601, microprocessor block 602, fiber optic interface 603, and GMR bridge 100.

Figure 8A:
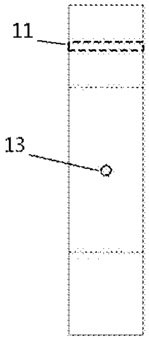
FIGS. 8A and 8B are schematic views of aspects of the disclosure.
Figure 8B:
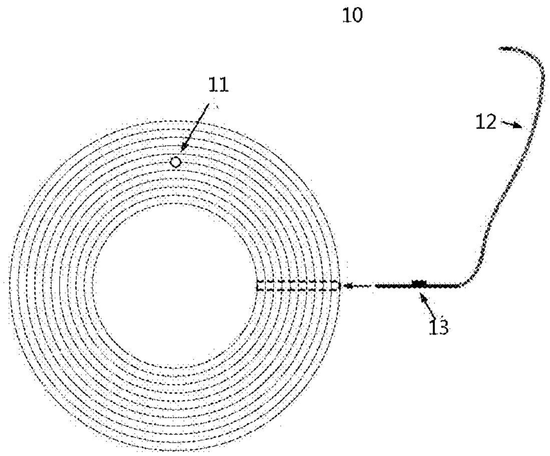

FIGS. 8A and 8B are schematic views of the flux sensor installation 10 and flux sensor 13 and associated electronics positioning within a toroidal core bore 13 with trailing sensor leads 12. Alternate position 11 is also shown.

Figure 9:
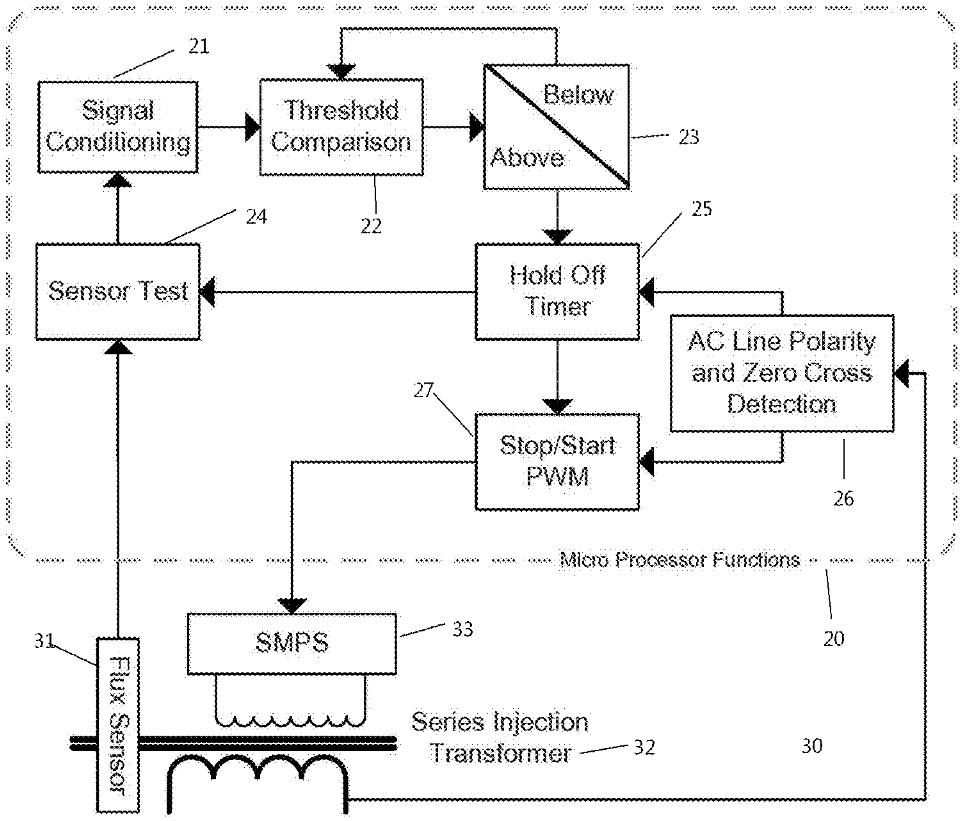
FIG. 9 is a flow chart of program instructions of the disclosure.

FIG. 9 is a flow chart of microprocessor program instructions for the disclosed system. Flux sensor installation 30 has SMPS 33, series injection transformer 32 and flux sensor 31. Flux sensor 31 sends flux density value output to microprocessor block 20, received by signal conditioning 21, then passed to threshold comparison 22, 23. If the received flux density value is below the threshold the next value is compared and so on through the half-cycle. If the sensor-transmitted density value is above the threshold, PWM gating/modification 27 is triggered, and when zero cross 26 is detected, hold-off timer 25 is triggered, with optional sensor test 24.

Figure 10:
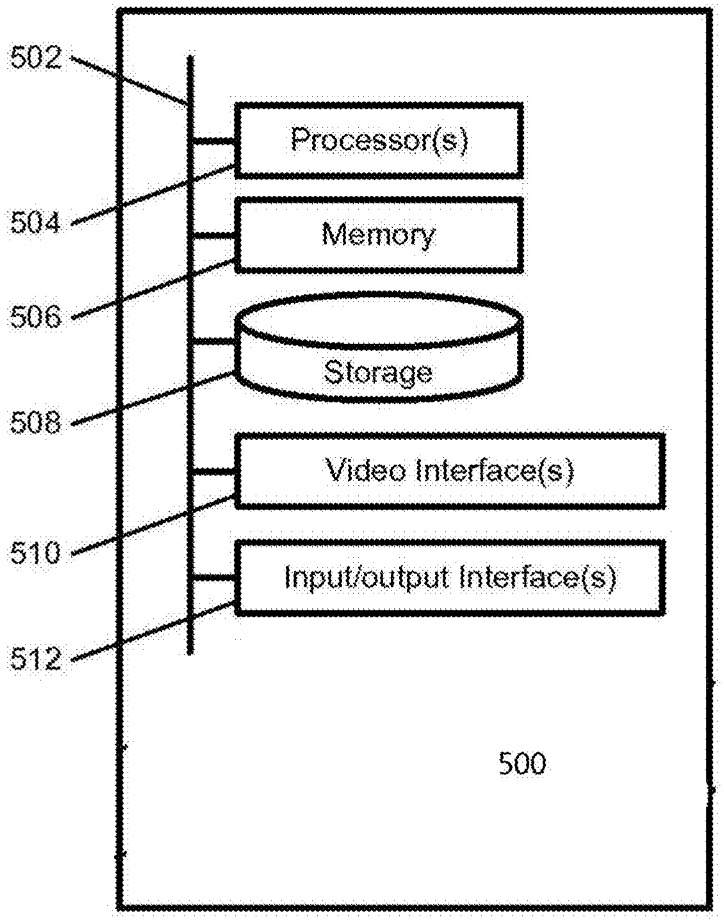
FIG. 10 is a schematic representation of a hardware processor.

FIG. 10 is a schematic representation of a conventional hardware processor 500 with bus 502, processor 504, memory 506, optional alternate storage 508, optional interfaces 510, and input/output 512.

Figure 11:
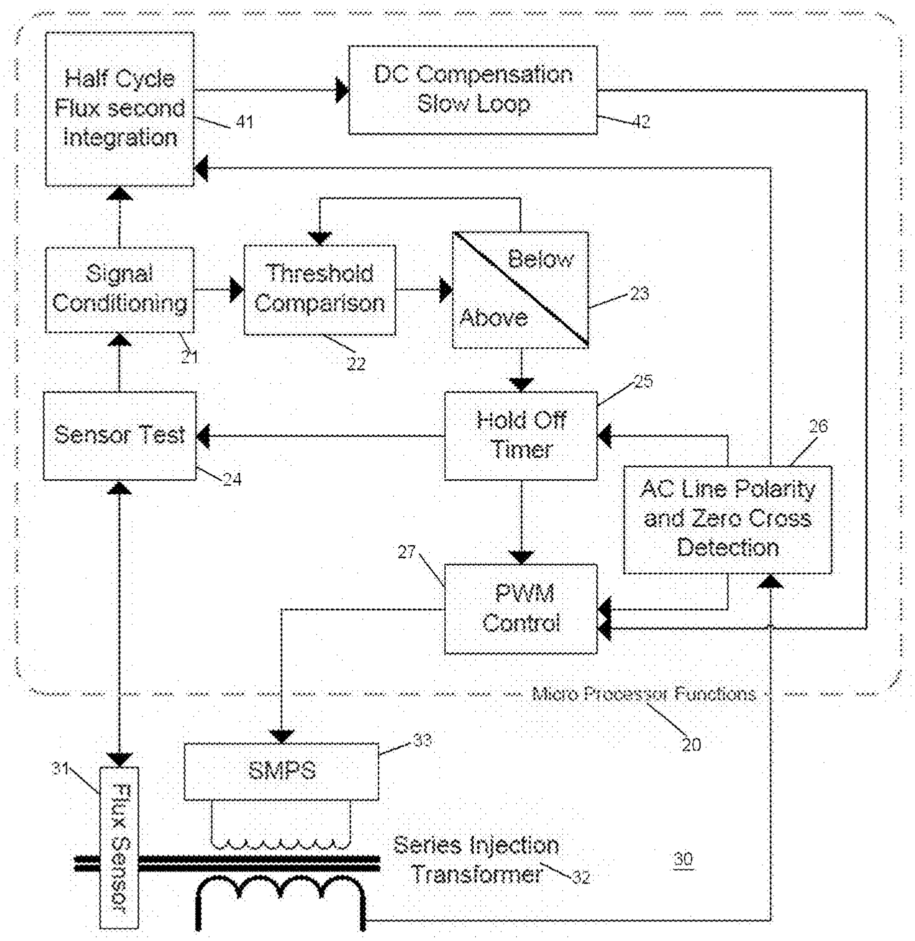
FIG. 11 is a flow chart of program instructions of the disclosure.

FIG. 11 is an alternate flow chart of hardware processor program instructions for the disclosed system. Flux sensor installation 30 has SMPS 33, flux sensor 31, and series injection transformer 32 which sends an appropriate value to AC line polarity and zero cross detection 26 (which in turn has respective inputs to PWM control 27, hold off timer 25 and half-cycle flux-second integration 41). Flux sensor 31 sends flux density value output to hardware processor block 20, received by optional sensor test 24 and passed to signal conditioning 21 at which block the sensor data is passed to half-cycle flux-second integration 41 and or (in systems combining both threshold limitation and DC offset control) to threshold comparison 22.

From integration 41 a value is passed to slow loop DC compensation 42 (and optionally to buffer comparator 43, see FIG. 12) and then to PWM control 27.

From threshold comparison 22 a value is sent to above/below threshold check 23 and then to optional hold off timer 25 in coordination with sensor test 24 before it goes to PWM control 27 which in turn controls the operation of SMPS 33.

Figure 12:
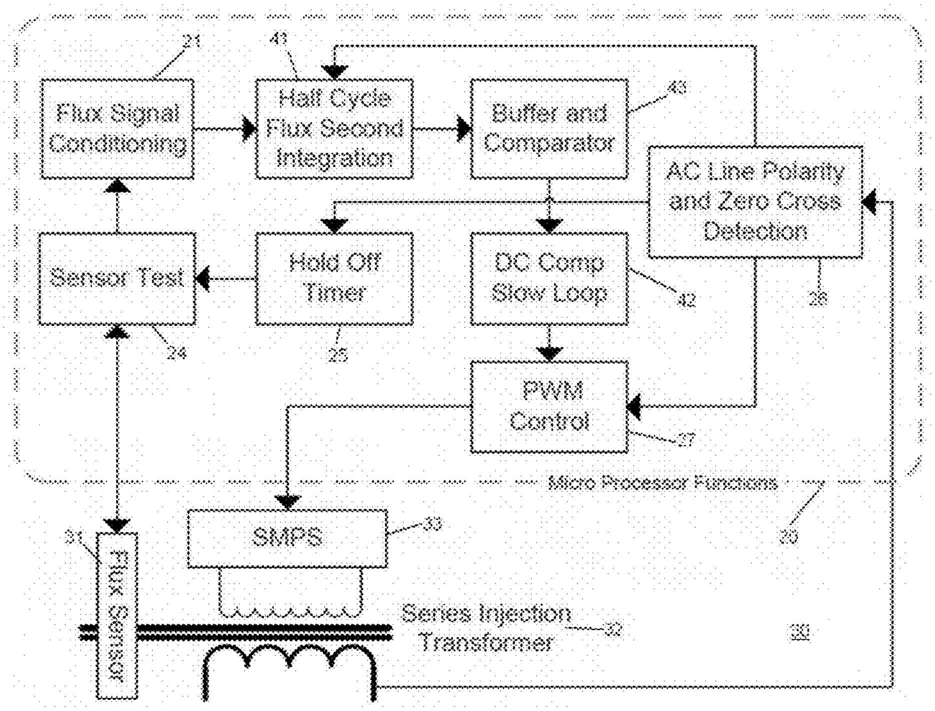
FIG. 12 is a flow chart of program instructions of the disclosure.

FIG. 12 is an alternate flow chart of hardware processor program instructions for the disclosed system. Flux sensor installation 30 has SMPS 33, flux sensor 31, and series injection transformer 32 which sends an appropriate value to AC line polarity and zero cross detection 26 (which in turn has respective inputs to PWM control 27 and half-cycle flux-second integration 41). Flux sensor 31 sends flux density value output to hardware processor block 20, received by optional sensor test 24 and passed to signal conditioning 21 at which block the sensor data is passed to half-cycle flux-second integration 41. From integration 41 a value is passed to buffer comparator 43 and thence to slow loop DC compensation 42, which then operates on PWM control 27 which in turn controls the operation of SMPS 33.

Figure 13:
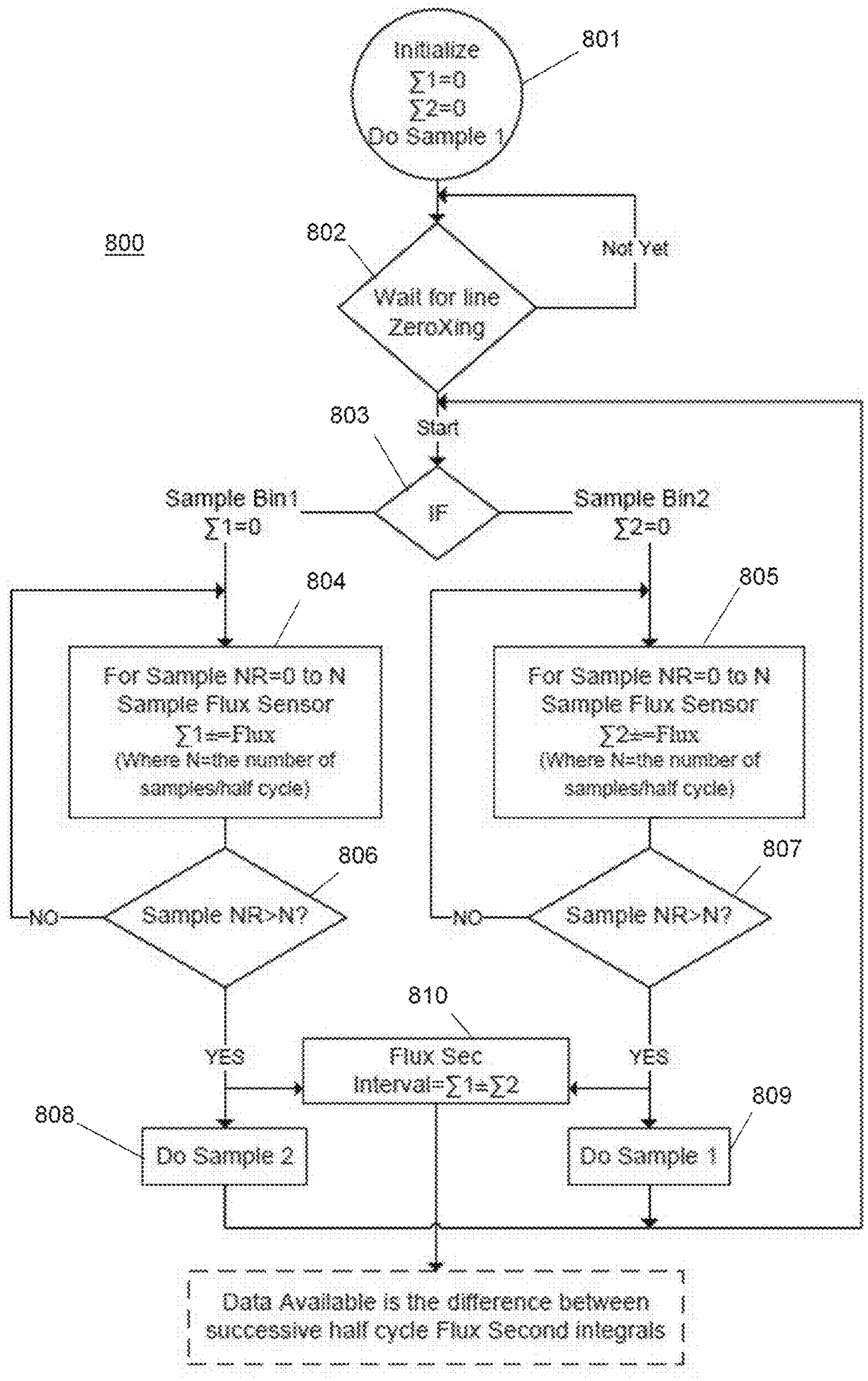
FIG. 13 is a logic flow chart for an aspect of the disclosure.

FIG. 13 schematically illustrates an example of a logic flow for the firmware for the flux-second integration and comparison. The filtered output from the flux sensor is desirably sampled as frequently as state of the art hardware will allow. The sampled flux values are binned into sequential positive & negative half cycle bins using the zero crossing and polarity information derived elsewhere from the line voltage. At the end of each half cycle period, which can be either a voltage half-cycle or a flux half-cycle, the values are integrated and subsequently buffered for use by a DC slow loop compensation circuitry so that over some time window that is advantageously adjustable (probably <1 second), the half cycle PWM is gently adjusted differentially with a selectable gain in a manner such that the net flux-second values net to zero. It is believed that details of slow loop gain and decay rate will be familiar to those skilled in the art of control loop theory.

In FIG. 13 illustrates a processing logic 800 for continuous, real time automatic flux-second integration and comparison. At Initialization 801 all variables are set to zero. Loop 802 provides a wait for zero crossing before summation begins. At the next zero crossing after initialization, the summations start. At first approach to IF juncture 803, summation for sample bin 1 commences, with SUM 1 starting at zero. All incoming flux values from the flux sensor are summed at integration loop 804 from NR=0 to N (a hardware appropriate selectable value stored in memory) until at checkpoint 806 NR=N. The bin 1 summed flux-second value is sent to comparator 810 and at operation 808 processing returns to start for sampling into sample bin 2. Comparison at 810 begins only when both bins have a value.

At IF juncture 803, SUM 2 starts at zero, and all incoming flux values from the flux sensor are summed at integration loop 805 from NR=0 to N until at checkpoint 807 NR=N. The bin 2 summed flux-second value is sent to comparator 810 and at operation 809 processing returns to start for sampling into sample bin 1.

At operation 810, Sum 1 is compared with Sum 2 and the signed difference is the difference between successive half-cycle flux-second integrals and that signed value is then sent to slow loop DC compensation circuit 42 (see e.g. FIG. 12) for further processing.

Figure 14A:
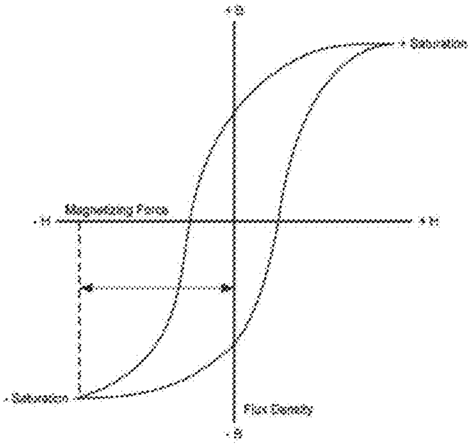
FIGS. 14A and 14B are schematic views of aspects of the disclosure.

FIG. 14A represents a typical hysteresis loop (B-H curve) of a core operating in a balanced condition. During normal operation the flux density values are contained within the lines of the two S-shaped curves. It is known that if the magnetizing force becomes too high, the flux density increases until it levels out and core saturation occurs.

Figure 14B:
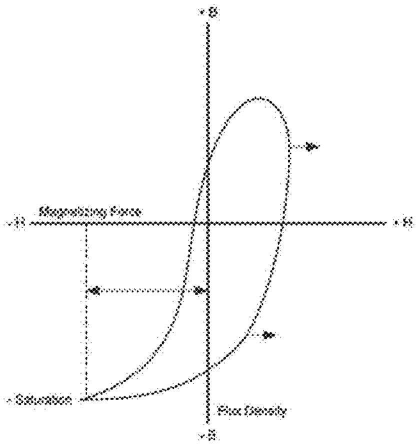

FIG. 14B illustrates the hysteresis loop of a core that is operating with a (for instance) negative DC offset. The B-H curves are shifted to the right, and the amount of magnetizing force required to saturate the core in the negative is less than was required in FIG. 14A. Under these conditions it is known that the positive flux value will never get as high as the negative, and therefore positive saturation is not possible in this condition. When the positive magnetizing force becomes greater than the negative magnetizing force, the B-H curve will then move to the left until it is re-centered and even potentially continue moving to the left until the core is in a positive (opposite) DC offset condition (not illustrated).

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be within the knowledge of those skilled in the art. No concerted attempt to repeat here what is generally known to the artisan has therefore been made.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

We claim:

1. A method for preventing magnetic flux saturation in a magnetizable material comprising therewithin a magnetic flux sensor transmitting magnetic flux density values, where the magnetic flux is induced by a primary driving voltage having opposite and alternating current phase half-cycles, the method comprising the steps of:

a microprocessor continuously receiving the transmitted magnetic flux density values;

the microprocessor comparing in real time during each driving voltage half-cycle each transmitted magnetic flux density value with a selectable and programmatically stored maximum flux density value, and the microprocessor triggering a reduction of the driving voltage to a voltage value greater than zero for the remainder of the half-cycle when the selectable maximum flux density value is reached in the half cycle.

2. The method of claim 1 wherein the magnetizable material is a transformer core.

3. The method of claim 2 wherein the magnetic flux sensor is disposed within a bore in the transformer core.

4. The method of claim 1 wherein the magnetic flux sensor is selected from the group of magneto-resistive sensors including a GMR, a TMR, a CMR and an EMR.

5. The method of claim 1 further comprising an electrically isolated, self-powered flux sensor.

6. The method of claim 5 further comprising fiber optic signal transmission from the flux sensor to the microprocessor.

* * * * *